United States Patent
Crampon et al.

(10) Patent No.: US 10,322,959 B2
(45) Date of Patent: *Jun. 18, 2019

(54) PROCESS AND DEVICE FOR CONTINUOUS THERMAL HYDROLYSIS (71) Applicant: Veolia Water Solutions & Technologies Support, Saint-Maurice (FR)

(72) Inventors: Cedric Crampon, Champigny-sur-Marne (FR); Malik Djafer, Boulogne (FR); Julien Chauzy, Antony (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 665 days.

This patent is subject to a terminal disclaimer.

(21) Appl. No.: 14/779,746

(22) PCT Filed: Mar. 6, 2014

(86) PCT No.: PCT/EP2014/054388
§ 371 (c)(1),
(2) Date: Feb. 3, 2016

(87) PCT Pub. No.: WO2014/154466
PCT Pub. Date: Oct. 2, 2014

(65) Prior Publication Data
US 2016/0185640 A1    Jun. 30, 2016

(30) Foreign Application Priority Data
Mar. 25, 2013 (FR) .................... 13 52686

(51) Int. Cl.
C02F 1/02     (2006.01)
C02F 11/04    (2006.01)
C02F 11/18    (2006.01)

(52) U.S. Cl.
CPC .............. C02F 11/18 (2013.01); C02F 11/04 (2013.01); C02F 1/025 (2013.01);
(Continued)

(58) Field of Classification Search
CPC .......... C02F 1/025; C02F 11/04; C02F 11/06; C02F 11/08; C02F 11/086; C02F 11/18;
(Continued)

(56) References Cited

U.S. PATENT DOCUMENTS 3,687,646 A * 8/1972 Brent et al. ............... C01B 3/36
                                                   110/220
4,983,296 A * 1/1991 McMahon ............. C02F 11/10
                                                   210/603
(Continued)

FOREIGN PATENT DOCUMENTS

EP    2177280 A2    4/2010
EP    2774894 A1 *  9/2014 .............. C02F 11/18
(Continued)

OTHER PUBLICATIONS

Perry et al., "Perry's Chemical Engineer's Handbook: Seventh Ed.," chapter 18, pp. 18-1 to 18-73 (Year: 1997).*

Primary Examiner — Lucas A Stelling
(74) Attorney, Agent, or Firm — Coats & Bennett PLLC (57) ABSTRACT

Method for the continuous thermal hydrolysis of sludges containing organic matter, said method comprising the steps of:
  simultaneously injecting pressurized steam (100) into said sludges and mixing said sludges with said steam by means of a dynamic mixer-injector (4) so as to obtain a single-phase mixture,
  conveying said single-phase mixture towards a tube reactor (4) under pressure and bringing about the plug flow of this mixture into said reactor for a retention time that is sufficient and at a temperature that is sufficient to enable the thermal hydrolysis of the organic matter present in said sludges,
  cooling said single-phase mixture at its exit from said tube reactor to a temperature enabling the subsequent digestion of the hydrolyzed organic matter that it contains,
  depressurizing said cooled single-phase mixture.

21 Claims, 3 Drawing Sheets

(52) U.S. Cl.
CPC .... *C02F 2201/002* (2013.01); *C02F 2209/02* (2013.01); *C02F 2209/03* (2013.01); *C02F 2301/066* (2013.01); *C02F 2303/06* (2013.01)

(58) Field of Classification Search
CPC ............ C02F 2201/002; C02F 2209/02; C02F 2209/03; C02F 2301/066; C02F 2303/06
See application file for complete search history.

(56) References Cited

U.S. PATENT DOCUMENTS

| | | |
|---|---|---|
| 7,968,760 B2 | 6/2011 | Lee, Jr. |
| 8,992,735 B2 | 3/2015 | Dauser |
| 2004/0168990 A1* | 9/2004 | Solheim .................. C02F 11/18 210/774 |
| 2011/0114570 A1* | 5/2011 | Hojsgaard ............... C02F 11/18 210/752 |

FOREIGN PATENT DOCUMENTS

| | | | | |
|---|---|---|---|---|
| EP | 2774894 A1 * | 9/2014 | ............. | C02F 1/025 |
| ES | 2551144 T3 * | 11/2015 | ............. | C02F 11/18 |
| WO | 2009121873 A1 | 10/2009 | | |
| WO | WO 2014135734 A3 * | 11/2014 | ............. | C02F 11/18 |
| WO | WO-2014135734 A3 * | 11/2014 | ............. | C02F 1/025 |

* cited by examiner

PROCESS AND DEVICE FOR CONTINUOUS THERMAL HYDROLYSIS

This application is a U.S. National Stage Application of PCT Application No. PCT/EP2014/054388, with an international filing date of 6 Mar. 2014. Applicant claims priority based on French Patent Application No. 1352686 filed 25 Mar. 2013. The subject matter of these applications is incorporated herein.

1. FIELD OF THE INVENTION

The present invention pertains to a method and a device for continuous thermal hydrolysis of sludges containing organic matter. These sludges can be derived for example from the treatment of domestic wastewater (sludges from cleaning processes, fats derived from pre-treatment operations) or derived from the treatment of industrial wastewater or it can come from drainage matter or from grease tanks. The term "sludges" shall be used here below in the document. Such sludges have a dryness of 10% to 50% by weight.

2. PRIOR ART

Sludges coming from the treatment of wastewater, whether of domestic or industrial origin, can be treated biological means, especially by anaerobic digestion.

The purpose of biological treatment is to degrade the organic matter contained in these sludges. This degradation can be aimed at stabilizing the sludges, enabling the production of energy and/or again reducing the volume of sludges. However, certain organic compounds are more difficult than others to degrade by biological means and it is known that pre-treatment by thermal hydrolysis accelerates the process of biological degradation. This heat treatment is generally carried out under pressure at a temperature of over 100° C., and in practice capable of going up to 220° C., for a predetermined period of time, in practice generally half an hour. Through such thermal hydrolysis treatment, the poorly biodegradable organic matter is degraded into compounds that are then more easily biodegradable.

Classically, this subsequent biological degradation can be done by digestion within an anaerobically operating closed reactor called a digester. Such anaerobic digesters cannot work properly unless they operate at an adequate and constant temperature generally requiring a heating system and unless they are properly stirred. This stirring is all the easier as the sludges entering the digester are fluids, i.e. they have low viscosity.

There are various types of known methods of thermal hydrolysis in the prior art. Certain of them are carried out by treating given quantities of sludges to be hydrolyzed, one by one, that is discontinuously (called batch operation) while other methods are designed to enable the continuous treatment, or at least semi-continuous treatment, of the sludges to be hydrolyzed.

In the prior art pertaining to these devices and methods of thermal hydrolysis, we can cite especially the patent documents WO96/09882 and WO2006/027062 both of which pertain to batch-treatment methods.

Such batch-treatment methods have the drawback of necessitating the management of the cycles of treatment of the different batches of sludges that have to be treated.

The techniques for the continuous or semi-continuous treatment of sludges by thermal hydrolysis include the techniques described in the patent document EP1198424 and those described in the patent document WO2009/121873.

In the technique described in EP1198424, the sludges are conveyed into a reactor where they travel in transit for a period of 5 to 60 min at a temperature of 130° C. to 180° C. The sludges hydrolyzed by such treatment are then cooled by means of a heat exchanger so as to make sure that their temperature is low enough to prevent the biomass of a digester from being destroyed. The energy thus recovered is used to heat the sludges before they enter the thermal hydrolysis reactor. This technique however implements steam recovery steps, the management of which, in practice, proves to be difficult and is a constraint for the user. In addition, these steam recovery steps give the method in question a semi-continuous rather than a continuous character.

In the technique described in the patent document WO2009/121873, the sludges are treated continuously in a tube-shaped thermal hydrolysis reactor into which steam is directly injected.

This method has the advantage of being a truly continuous method. However, although this method has considerably improved commercially existing methods for treating sludges by thermal hydrolysis, it nevertheless has certain drawbacks.

Firstly, if the viscosity of the sludges to be hydrolyzed introduced into the reactor is excessively high, it can be difficult to inject steam into them. In practice, this method can treat sludges that have a high dryness ratio or "dry solids content". Beyond certain dryness ratios, the thermal hydrolysis could prove to be incomplete or non-optimal, which would limit the performance of the anaerobic digestion placed downstream from the thermal hydrolysis.

Secondly, the experiments conducted by the Applicant have shown that the thermal and mechanical constraints observed within the thermal hydrolysis reactor used in the method described in WO2009/121873 could necessitate special constructional arrangements. It has been observed that the steam injected was not totally condensed in the sludges beyond certain dryness ratios. In practice, the steam injected into the reactor can follow preferred paths. This problem is besides identified in the patent WO2009/121873, especially the first paragraph of page 5 of this document which specifies that when the reactor has a horizontal part, the steam and the sludges can tend to get separated into two layers, namely an upper layer containing steam and a lower layer containing sludges.

Now, for all the methods of thermal hydrolysis and especially for those that work continuously, the critical phase of the method corresponds to the transfer of the steam into the sludge and its condensation therein. Indeed, if this phase is not done properly, the performance of the method of thermal hydrolysis can be considerably impaired whether it is in terms of chemical reaction or in economic terms since the quantity of steam to be used is then greater.

The methods of thermal hydrolysis on dewatered sludges therefore come against the difficulty of injecting steam into the sludges in an efficient way and, as a corollary, against the difficulty of mixing them if they are too viscous. Since the sludges are viscous by nature, the greater their dryness, the more difficult it is for the steam to be injected into the sludge, to be mixed with it and to transfer its energy to it to bring about the thermal hydrolysis of the poorly biodegradable compounds.

In the batch methods, it is planned to carry out a stirring operation in the treatment tanks to promote the intimate mixing of the steam with the sludges to be treated. Through such a stirred mixture made in the stirring tanks, the mixing of sludge and steam becomes intimate and the steam finally yields its energy in getting condensed in the sludges. However, in continuous-operation methods as well as in batch-operation methods, the problem constituted by the dryness of the sludges is a major one and, in practice, at least in the industrial-scale transposition of the techniques described and claimed in the patent documents described here above, the sludges must be limited to 25% of dry matter by weight.

The patent document WO2009/121873 recommends the use of static or dynamic mixers in the reactor so as to improve the mixing of this steam with the sludges. This is explained in the last paragraph of page 5 of WO2009/121873. Such mixers are particularly recommended when the steam is injected into a horizontal part of the reactor since such a horizontal part is identified, at indicated here above, as a zone in which steam has a special propensity for finding a preferred path of discharge and not getting fully mixed with sludge, hence not properly yielding its energy to the sludge. This propensity therefore lowers the performance of the thermal hydrolysis reactor. It will be noted however that, to the Applicant's knowledge, no industrial-scale embodiment implementing such dynamic or static mixers has effectively been implemented in commercial-scale installations until now.

Besides, in these installations, the hydrolysis reactors are of great length. This great length has a corresponding high retention time or retention time for the sludges and steam in the reactor. Thus, the coefficient of transfer of energy from the steam to the sludge can be optimized. However, such great reactor lengths entail high manufacturing costs.

3. GOALS OF THE PRESENT INVENTION

The goal of the present invention is to propose a method, and a device associated with the application of this method, that improves the technique disclosed in WO2009/121873. This document is considered here to be the prior art closest to the invention, which shall be described here below.

In particular, it is a goal of the present to describe such a method and such a device that enable the treatment of sludges intended for thermal hydrolysis and having a dry solids content greater than the maximum dry solids content that can be effectively implemented by the prior art, and to achieve this without impairing the performance of the digestion that classically follows the thermal hydrolysis of the sludges.

It is a also a goal of the present invention to propose a method of this kind and a device of this kind making it possible to obtain homogenous temperatures of the mixture of sludges and steam inside the reactor in order to attain high performance values of thermal treatment and thus do away with the mechanical constraints on the reactors related to inhomogenous temperatures.

It is yet another goal of the present invention to disclose such a method and such a device that reduce the consumption of steam necessary for the hydrolysis of the sludges.

It is yet another goal of the invention to describe such a method and such a device that can use reactors of smaller volumes, especially smaller lengths, than in the prior art while at the same time providing for optimized condensation of the steam in the sludges.

It is yet another goal of the invention to describe such a method and such a device that enable the hygienization of the sludges.

4. SUMMARY OF THE INVENTION

All or part of these goals are achieved according to the invention which first of all relates to a method for the continuous thermal hydrolysis of sludges containing organic matter, said method comprising the steps of:

simultaneously injecting pressurized steam into said sludges and mixing said sludges with said steam by means of a dynamic mixer-injector so as to obtain a single-phase mixture, conveying said single-phase mixture towards a tube reactor under pressure and bringing about the plug flow of this mixture into said reactor for a retention time that is sufficient and at a temperature that is sufficient to enable the thermal hydrolysis of the organic matter present in said sludges, cooling said single-phase mixture at its exit from said tube reactor to a temperature enabling the subsequent digestion of the hydrolyzed organic matter that it contains, depressurizing said cooled single-phase mixture.

It will be noted that, in the present description, the term "dynamic mixer-injector" is understood to refer to any mixer constituted by a preferably cylindrical chamber that continuously receives said sludges, means for injecting steam directly into said chamber and means to prompt the vigorous stirring, through motor-driven mechanical means, of the different phases entering said chamber. The stirring is strong enough to enable a single-phase mixture of sludges and steam to be obtained. In practice, such means can advantageously be constituted by blades mounted on a rotation shaft moved by a rotor rotating at a speed of over 500 rpm, preferably 1000 rpm to 2000 rpm. It will be noted that the purpose of such stirring means is not to push the matter into the chamber but only to stir it. Thus, when they include blades, these blades are shaped according to the knowledge of those skilled in the art so that putting them into motion does not cause matter to move forward into the chamber.

In the method of continuous thermal hydrolysis according to the invention, the retention time of the matter in the dynamic mixer-injector is short. The preferably cylindrical chamber of the mixer-injector therefore advantageously has a small volume. As a corollary, the load loss of this matter when it passes into the chamber is small. In practice, this load loss must be smaller than 10%.

The mixer-injector implemented in the framework of the invention is therefore distinct from the simple mixers constituted by a tank provided with stirring means in which the time of retention of the matter is lengthy and enables the treatment of only a given limited quantity of this matter at a time.

This mixer-injector is also distinct from simple sludge-conveying devices, for example devices using worm screws.

Thus, the invention proposes to carry out the mixing of pressurized steam with the sludges to be hydrolyzed in order to obtain a perfect, single-phase mixture of heated sludges upstream to the thermal hydrolysis step subsequently performed in a tube reactor.

Thus, according to the invention, the phase for mixing sludge with pressurized steam is clearly distinct from the phase of thermal hydrolysis. Besides, both these phases are conducted efficiently in distinct apparatuses.

The single-phase mixing done prior to the thermal hydrolysis enables the steam to get condensed in the sludges at the dynamic mixer-injector This homogeneous mixture is then conveyed to the reactor where it can flow in a plug flow. In the form of single-phase liquid phase, it enters the reactor at uniform or almost uniform temperature at which the poorly biodegradable compounds can undergo thermally hydrolysis efficiently and in an optimized way.

Classically, at the exit from the tube reactor, this single-phase mixture which contains hydrolyzed, organic matter is brought to a temperature and a concentration, by dilution if necessary, enabling its subsequent digestion Thus, the invention is clearly distinct from the prior art and especially from the patent document WO20069/121873 by the characteristic according to which the mixing of sludges to be hydrolyzed with the steam is done upstream to the thermal hydrolysis reactor and not within it.

Such an option marks a break with the teaching of this prior art which indicated the possibility of using a static or dynamic mixer integrated with the reactor. This prior art does not make it possible, however, to obtain a mixture that is homogeneous enough to optimize the thermal hydrolysis. The present invention resolves this problem by making this mixture upstream to the reactor so that the phase that enters this reactor is completely homogenous and so that the energy provided by the steam within this mixture can be transferred to the sludge in such a way that all the matter capable of being thermally hydrolyzed can be hydrolyzed by providing for a sufficient retention time, i.e. a sufficient length of reactor.

Through the homogeneity of the sludge and steam travelling through the reactor, a homogeneity of temperature of this mixture can be obtained in it. Such homogeneity of temperature can remove the need for preferred paths to carry steam within the reactor and, as a corollary, remove the thermal and mechanical constraints inherent in the appearance of such preferred paths of flow.

In particular, the perfect mixing of steam and sludges uniformly reduces their viscosity and therefore removes the mechanical effects related to sludge shear.

The obtaining of a single-phase homogeneous mixture of sludges heated upstream to the reactor, obtained from sludges to be hydrolyzed and steam, within a dynamic mixer-injector has the advantage of enabling the treatment of sludges to be hydrolyzed with high dry solids content, and especially a dry solids content of over 20% by weight.

According to a preferred variant of the invention, at its exit from said mixer-injector, said single-phase mixture has a temperature of 100° C. to 200° C. (i.e. the temperature in the reactor enabling the thermal hydrolysis of the organic matter present in said sludges) and pressure of 1 bar a to 25 bar a. It will be noted that, in the present description, the unit of pressure in the absolute bar or bar a.

Advantageously, at its exit from said mixer-injector, said single-phase mixture has a temperature of 150° C. to 170° C. (i.e. the temperature in the reactor enabling the thermal hydrolysis of the organic matter present in said sludges) and pressure of 5 bar a to 20 bar a.

According to a preferred variant of the invention, the steam that will be used to make the single-phase mixture will have a temperature of 100° C. to 220° C. and a pressure of 1 bar a to 23 bar a. Preferably, among all the possible values, a temperature of 180° C. to 200° C. and a pressure of 10 bar a to 16 bar a will be chosen for this steam.

The quantity of steam thus provided to the sludges will depend on the dry solids content of these sludges as well as on their concentration in organic matter to be hydrolyzed.

As indicated here above, the retention time of the single-phase mixture within the reactor will be sufficient to enable the thermal hydrolysis of the organic matter but, in principle, will preferably range from 10 minutes to 2 hours and preferably, inter alia, from 20 to 40 minutes.

Advantageously, the retention time of said single-phase mixture in said reactor will be at least 20 minutes and the temperature of said mixture in the reactor will be at least 100° C. so that the method of the invention will also enable the hygienization of said sludges, the totality of these sludges then being subjected to the steam for a sufficiently lengthy period of time, and at a sufficiently high temperature. A temperature of over 70° C. for at least 20 minutes applied to the sludges is necessary to hygienize them.

According to a preferred variant of the invention, the step for cooling the single-phase mixture at its exit from the tube reactor at a temperature enabling the subsequent digestion of the hydrolyzed organic matter that it contains will be carried out by addition of water and/or sludges and/or by the use of a heat exchanger. This will also enable the dilution of this single-phase mixture. Such dilution is indeed necessary to enable efficient subsequent digestion of these thermally hydrolyzed sludges. This mixture will then attain a sufficiently low temperature and will be diluted enough to comply with the biology of the digester.

Also preferably, the method according to the invention comprises preliminary steps for dewatering and homogenizing the sludges in order to convey them to the dynamic mixer-injector, these preliminary steps leading to sludges having a dry solids content of 10% to 50% by weight, advantageously 20% to 35% by weight. It may be recalled that, in practice, the prior-art devices do not enable the efficient hydrolysis of sludges having a dry solids content of over 25% by weight.

According to one advantageous variant of the method of the invention, it comprises a step for adapting the conditions of implementation of the dynamic mixture according to the dry solids content of the sludges. Thus, the dynamic mixer-injector will include a bladed rotor. The speed of rotation of these blades could be modified according to the dry solids content so that the single-phase mixture can be made even when this dry solids content is high According to another aspect, the invention also covers any method for implementing the above-described method comprising:
means for intake of sludges containing organic matter,
means for intake of pressurized steam,
a tube reactor for thermal hydrolysis,
means for injecting dilution water and/or sludges provided downstream from said tube reactor,
means for cooling provided downstream from said tube reactor,
characterized in that it comprises at least one dynamic mixer-injector provided upstream to said tube reactor for thermal hydrolysis and,
means for depressurizing provided downstream from said cooling means.

Such a device according to the present invention can be clearly distinguished from the prior art disclosed WO2009/121873 by the characteristic according to which a dynamic mixer-injector is planned upstream to the technical hydrolysis tube reactor and not integrated with the thermal hydrolysis reactor. As specified here above, the use of instrumentation to mix the sludges to be thermally hydrolyzed and the steam, namely the use of the dynamic mixer, and a distinct instrumentation to carry out the thermal hydrolysis of the thermally hydrolysable compounds contained in these sludges, namely a tube reactor, optimizes the working of this thermal hydrolysis tube reactor. This optimization leads to obtaining hydrolyzed sludges having a higher content in hydrolyzed compounds easily digestible within a digester and to the possibility of being able to give this tube reactor a smaller volume.

Such a device according to the invention therefore enables the treatment of the sludges by thermal hydrolysis in a smaller reactor volume. This is a non-negligible economic advantage over the prior art.

As already specified, different types of dynamic mixers could be used in the implementing of the present invention. However, the device according to the invention will advantageously be provided with a dynamic mixer-injector that has a chamber provided with a bladed rotor, the speed of rotation of which could be adapted to the dry solids content of the sludges as indicated here above and in practice rotating at more than 500 rpm and preferably between 1000 rpm and 2000 rpm. It will be noted that the geometry of the blades could itself be adapted to the dry solids content and viscosity of the sludges.

The prior art according to the patent WO2009/121873 provides, in its general descriptive part, for approximately all the possible shapes of tube reactor. However, the embodiments of this technique given in this patent document recommend that this reactor be made horizontally. One embodiment described in this patent document WO2009/121873 provides for an entry of sludges into one end of the tube reactor, with an injection of steam in proximity to this end, an exit of hydrolyzed sludges being provided at the other end of this tube reactor, means for injecting cooling water being provided at this second end. In another embodiment described in this patent document WO2009/121873, the thermal hydrolysis tube reactor has a first vertical part extended by a second longer horizontal part. The reason why each of these preferred embodiments has a relatively long horizontal part results from the need to put the sludge into contact with steam for a sufficiently lengthy retention time so that not only does the thermal hydrolysis occur but, prior to this hydrolysis, within the tube reactor, the steam injected at the start of the reactor can get condensed in the sludges in order to transfer to them the energy needed for their hydrolysis.

Through the invention, since the injection of steam has taken place upstream to the reactor, through the use of the dynamic mixer-injector, it is a perfectly mixed single-phase mixture that arrives into the reactor so much so that the reactor in question no longer has to act as a condenser but only as a thermal hydrolysis reactor. Its volume can therefore be reduced as compared with the prior art. Indeed, in the prior art, the reactor must act both as a condenser and as a reactor, and this gives it a great volume and especially a great length.

According to the invention, the thermal hydrolysis reactors implemented could have varied shapes. However, according to a preferred variant, the tube reactor for thermal hydrolysis will be vertical and will have an inlet at its lower end and an outlet at its upper end.

According to another preferred variant, this tube reactor for thermal hydrolysis will have a first vertical section directly extended by a second vertical section, the inlet of the reactor being provided at the foot of said first vertical section and the outlet of said reactor being provided at the foot of said second vertical section. It will be noted that, in the context of the present invention, the expression first vertical section "directly extended by a second vertical section" will be understood to cover the embodiments in which there is no straight horizontal section provided between the first vertical section and the second vertical section. Indeed, such a horizontal section is unnecessary inasmuch as the tube reactor of the device according to the invention is a thermal hydrolysis reactor and not a reactor also acting as a condenser.

According to yet another variant, said tube reactor for thermal hydrolysis has a first vertical section connected to a second vertical section, the inlet of the reactor being provided at the head of said vertical section and the outlet of said reactor being provided at the foot of said second vertical section.

According to an interesting variant, the device according to the invention also comprises a heat exchanger provided downstream from the reactor.

Also advantageously, the device comprises a pump and a valve, preferably a progressing cavity pump, intended to maintain the pressure in the tube reactor for thermal hydrolysis.

5. LIST OF FIGURES

The invention as well as its different advantages will be understood more easily from the description of embodiments given with reference to the figures, of which.

6. DESCRIPTION OF EMBODIMENTS

Figure 1:
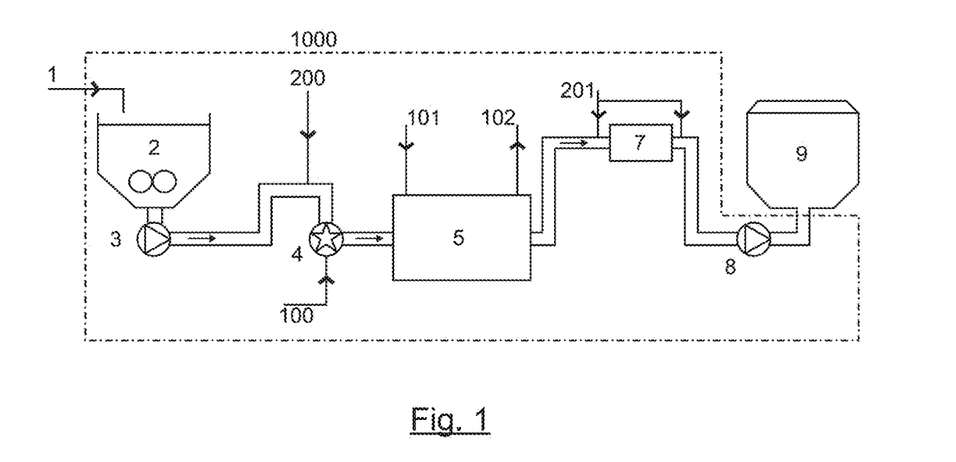
FIG. 1 is a schematic view of a device for the thermal hydrolysis of sludges according to the invention (surrounded by a line of dots and dashes) integrated into an installation including a digester provided downstream from this digester.

Referring to FIG. 1, a device according to the invention is described schematically. This device 1000 is integrated into an installation including a digester 9 that is not a part as such of the device according to the invention.

Such an installation can be used to implement a method of lysis-digestion (LD) but it will be noted that it is also possible to integrate the method according to the invention into known prior-art configurations called digestion-lysis (DL) or digestion-lysis-digestion (DLD), given that in the configuration called DL a part of the sludge is hydrolyzed and then returned to the digester.

Referring to FIG. 1, centrifuged sludges are conveyed by a pipe 1 to a hopper 2 provided with two worm screws enabling these sludges to be homogenized.

These two worm screws also serve to cram a feeder pump 3 feeding sludges to the dynamic mixer-injector 4. The dewatered and homogenized sludges coming from the hopper 2 are thus pumped by means of the pump 3 into a pipe using means for leading these sludges into the dynamic mixer-injector 4. This dynamic mixer-injector 4 is also provided with means for injecting steam 100 generated by a steam generator not shown in FIG. 1. The mixer-injector comprises a cylindrical chamber provided with stirring means constituted by blades mounted on a rotation shaft moved by a rotor rotating at a speed of 1000 rpm to 2000 rpm, this speed being adjustable according to the dry solids content of the sludges. The retention time of the matter travelling continuously through the mixer-injector is short and, in practice, shorter than 10 min. The blades do not make the matter move forward in the chamber but only stir it vigorously.

A wash water intake 200 is planned upstream to the dynamic mixer-injector 4. Through such water inflow means 200, the dynamic mixer-injector could be cleaned if need be.

At the exit from the dynamic mixer, a pipe enables the single-phase mixture made within this mixer to be conveyed towards a thermal hydrolysis reactor 5.

The treatment within this thermal hydrolysis reactor 5 is done at a temperature of 165° C. to 180° C., the interior of the reactor being maintained at a pressure of 8 bar a to 10 bar a (in this respect, it will be noted that lower or higher pressures could be implemented, depending especially on the dry solids content of the sludges).

A water inlet 101 situated at the entry to the reactor 5 is provided to enable cleaning water to be led into the reactor during the cleaning phases that can be carried out when starting up the installation or during phases of maintenance of the installation.

At the exit from the reactor 5, a drain 102 is, for its part, provided in order to remove non-condensable gases if any.

The hydrolyzed sludges in the reactor 5 are then conveyed by a pipe to a heat exchanger 7. Before reaching this heat exchanger 7 cooling and dilution water is led into the hydrolyzed sludges by water injection means 201. If need be, this dilution could also be done after the exchanger 7.

At the exit from the exchanger 7, the diluted sludges are conveyed to the digester 9. The depressurizing unit 8 which, by definition, causes a drop in pressure, is used to maintain the pressure prevailing in the thermal hydrolysis reactor 5. In the present example, this unit is constituted by a progressing cavity pump provided between the heat exchanger and the digester. In other embodiments, it could be constituted by a valve or any other unit used to carry out this function.

At the exit from the device according to the invention, the thermally hydrolyzed sludges are sent to the digester 9 where they can be easily digested because they have undergone thermal hydrolysis.

It is clearly specified that the representation in FIG. 1 of an installation integrating a device according to the invention is a schematic representation. In particular, the reactor 5 in which the thermal hydrolysis of the single-phase mixture of sludges and steam is carried out could have different shapes. Three of these shapes are given with reference to FIGS. 2, 3 and 4.

Figure 2:
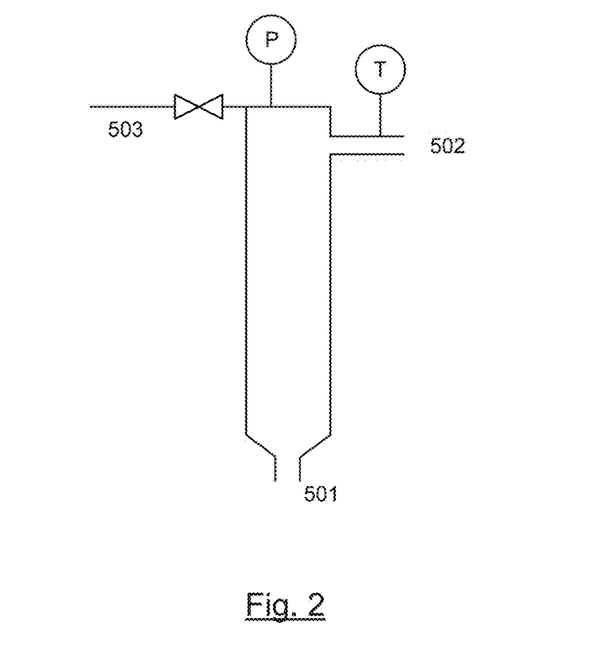
FIG. 2 represents a form of thermal hydrolysis tube reactor that can be implemented in the present invention.

As shown in FIG. 2, the reactor 5 has a vertical shape. The reactor is provided, in its lower part, with an intake of single-phase mixture of sludges heated with steam 501 and, in its upper part, with an outlet from the reactor 502. A drain 503 is provided to remove any non-condensable gases and means for measuring the pressure prevailing inside the reactor are also provided in its upper part.

Figure 3:
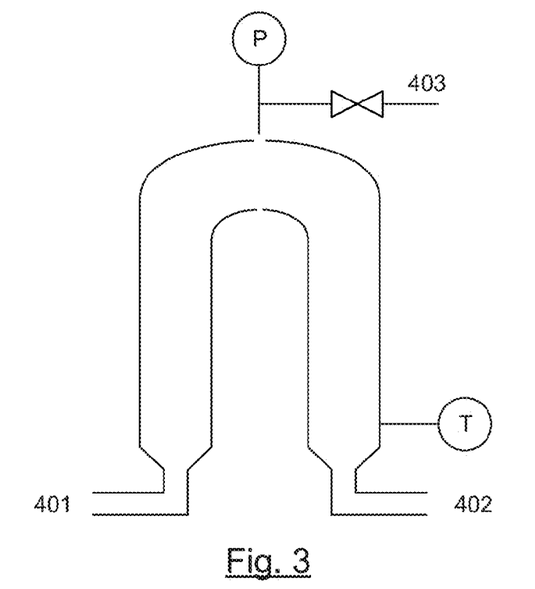
FIG. 3 represents another form of a thermal hydrolysis tube reactor that can be implemented in the present invention.

Referring to FIG. 3, the thermal hydrolysis reactor has a first vertical section provided at its base with an intake of single-phase mixture of sludges and steam 401, directly connected to a second vertical part provided at its foot with a discharge feature 402 for hydrolyzed sludges. A drain 403 is provided at the junction between these two vertical parts to remove the non-condensable gases if any. Means for measuring the pressure and the temperature in the reactor are also planned. It will be noted that, in this configuration, the second vertical section part is directly connected to the first vertical section without a horizontal section between the two.

Figure 4:
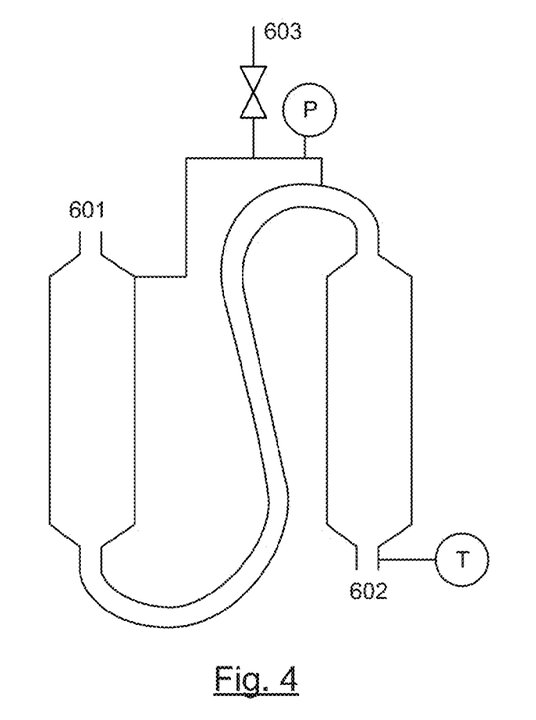
FIG. 4 represents yet another form of thermal hydrolysis tube reactor that can be implemented in the present invention.

Referring to FIG. 4, the thermal hydrolysis reactor has a first vertical section provided at its head with an intake of single-phase mixture of sludges and steam 601, directly connected to a second vertical part provided at its foot with a discharge 602 of the hydrolyzed sludges. A drain 603 is provided at the junction between these two vertical parts to remove the non-condensable gases if any. Means for measuring the pressure and the temperature in the reactor are also planned. It will be noted that, in this configuration, the second vertical section part is directly connected to the first vertical section without a horizontal section between the two.

Figure 5:
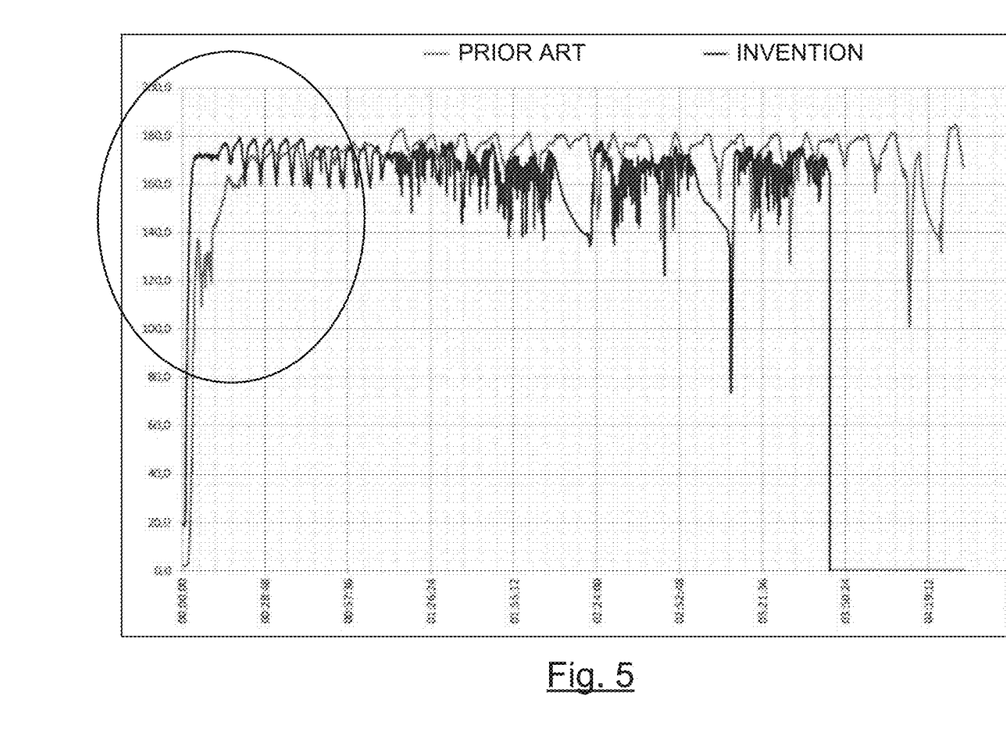
FIG. 5 is a graph showing, on the one hand, the development of the temperature within the tube reactor of a prior-art installation according to the patent documents WO2009/121873 that does not integrate a dynamic mixer-injector but in which steam and sludge are conveyed to the head of the reactor and, on the other hand, the development of the temperature within the tube reactor of an installation corresponding to the invention integrating a dynamic mixer-injector in which steam and sludge are mixed and then conveyed in the form of a homogeneous single-phase mixture to the head of the reactor.

FIG. 5 shows the progress in time of the temperature prevailing within the thermal hydrolysis reactor:
  on the one hand, in the invention, implementing a dynamic mixer-injector provided upstream to the thermal hydrolysis reactor and;
  on the other hand, in a similar installation according to the prior art in which no dynamic mixer-injector is used, the steam being injected at the foot of the reactor.

Referring to this FIG. 5, it can be seen that, in the present invention, the temperature prevailing within the reactor gradually rises until it reaches and keeps the set-value temperature enabling the optimized thermal lysis of the hydrolysable organic compounds contained in the treated sludges.

In the prior art, the temperature observed in the reactor is, at the outset, that of the injected steam. The temperature then undergoes major variations. This results from the fact that, in the technique according to this prior art, there is no systematic occurrence of an intimate mixing of steam with the sludges. On the contrary, the temperature fluctuations observed within the reactor result from the existence of polyphase flows within it. In the example described here, since the steam is injected at a speed (in practice above 5 m/s) far greater than that of the sludges (in practice below 3 m/s), it finds preferred passage through this sludge and does not intimately mix with this sludge, and does not efficiently yield its energy to the sludge.

Quite to the contrary, through the use of a dynamic mixer-injector according to the invention upstream to the hydrolysis reactor, the mixture reaching this reactor is a perfectly liquid and homogenous single-phase mixture. It can therefore flow in a plug flow in this reactor. The set-value temperature is kept throughout the retention time in the reactor. The energy of the steam is therefore transferred in an optimized way to the sludges and the hydrolysis of the poorly biodegradable compounds can be done efficiently.

It will also be noted that, through the invention, the theoretical quantity of energy to hydrolyze a given quantity of sludges corresponds more or less to the quantity effectively implemented to obtain this hydrolysis. In this respect, it will be noted that it is easy to compute the energy needed to increase the temperature of a fluid from a temperature A to a temperature B. In the framework of trials made by the Applicant, the computed theoretical flow rate of steam was 25 kilograms of steam at 13 bar a per hour, and the trials have shown that it was exactly this flow rate of steam that was effectively necessary to efficiently hydrolyze the sludges.

In the prior-art installation, it was shown that the mixture between the sludge to be hydrolyzed and the steam was imperfect since the quantity of steam effectively injected to heat the sludge (15 kg/h) was smaller than the theoretically computed quantity (25 kg/h). A certain quantity of steam was therefore not condensed in the sludge. The presently described trials confirm the interest of the present invention.

Finally, it will be noted that the invention enables the use of reactors having a volume 20% to 25% smaller than the volumes of the prior-art reactor.

The invention claimed is:

1. A method for the continuous thermal hydrolysis of sludge containing organic matter, said method comprising the steps of:
    simultaneously injecting steam and the sludge into a dynamic mixer-injector having a chamber and rotating blades in the chamber;
    mixing the steam and sludge in the chamber of the dynamic mixer-injector to form a single-phase mixture by rotating the blades greater than 500 rpm in the chamber;
    conveying said single-phase mixture from the dynamic mixer-injector to a downstream tube reactor that is distinct from the dynamic mixer-injector;
    wherein conveying the single-phase mixture from the dynamic mixer-injector to the tube reactor includes conveying the single-phase mixture under pressure and moving the single-phase mixture in a plug flow fashion through the tube reactor;
    maintaining the temperature and retention time of the single-phase mixture in the reactor sufficient to thermally hydrolyze the organic matter present in the sludge;
    directing the single-phase mixture from the tube reactor;
    after exiting the tube reactor, cooling the single-phase mixture to a temperature that enables the subsequent digestion of the hydrolyzed organic matter in the single-phase mixture; and
    depressurizing the cooled single-phase mixture.

2. The method according to claim 1, characterized in that, at an exit from said dynamic mixer-injector, said single-phase mixture has a temperature of 100° C. to 200° C. and a pressure of 1 bar a to 25 bar a.

3. The method according to claim 2, characterized in that, at the exit from said dynamic mixer-injector, said single-phase mixture has a temperature of 150° C. to 170° C. and a pressure of 5 bar a to 20 bar a.

4. The method according to claim 1 characterized in that the steam used to make the single-phase mixture has a temperature of 100° C. to 220° C.

5. The method according to claim 1 characterized in that said retention time for said single-phase mixture in said tube reactor is from 10 minutes to 2 hours.

6. The method according to claim 1 characterized in that said single-phase mixture is cooled and diluted downstream from the tube reactor by addition of water or sludge.

7. The method according to claim 1 characterized in that the method further comprises preliminary steps including dewatering and homogenizing the sludge and producing a sludge having a dry solids content of 10% to 50% by weight.

8. The method of claim 1 wherein the speed of the rotating blades is modified according to the dry solids content of the sludge so that the single phase mixture can be made even when the dry solids content is high.

9. The method of claim 1 wherein the tube reactor includes a first vertical section and a second vertical section and wherein the first vertical section includes an inlet provided at the foot of the first vertical section and wherein the second vertical section includes an outlet provided at the foot of said second vertical section; and wherein the first and second vertical sections are interconnected by a curved section.

10. The method of claim 1 including adjusting the speed of the rotating blades according to the dry solids content of the sludge.

11. The method of claim 1 including rotating the blades in the chamber of the dynamic mixer-injector 1000-2000 rpm which mixes the steam and sludge to form a liquid single-phase mixture.

12. A method of thermal hydrolyzing sludge containing organic matter comprising:
    dewatering the sludge;
    pumping the sludge to a dynamic mixer-injector;
    moving the sludge through the dynamic mixer-injector having a chamber and rotating blades in the chamber;
    generating steam;
    injecting the steam into the dynamic mixer-injector;
    rotating the blades in the chamber of the dynamic mixer-injector greater than 500 rpm and contacting the sludge in the dynamic mixer-injector with the rotating blade and mixing the sludge with the steam to form a homogeneous single-phase mixture;
    transferring the single phase mixture to a thermal hydrolysis reactor located downstream from the dynamic mixer-injector and distinct from the dynamic mixer-injector;
    moving the single phase mixture through the thermal hydrolysis reactor in a plug flow fashion and maintaining the temperature and the retention time of the single phase mixture in the thermal hydrolysis reactor sufficient to hydrolyze the organic matter in the sludge;
    after thermally hydrolyzing the sludge, cooling the sludge by mixing dilution water with the sludge;
    after thermally hydrolyzing the sludge, directing the sludge through a heat exchanger and cooling the sludge; and
    directing the cooled thermal hydrolyzed sludge to a digester and digesting the sludge.

13. The method of claim 12 wherein after exiting the dynamic mixer-injector, the single phase mixture has a temperature of approximately 150° C. to approximately 170° C. and at a pressure of approximately 5 bar a to approximately 20 bar a; and wherein the retention time of the single phase mixture in the thermal hydrolysis reactor is approximately 10 minutes to approximately 2 hours; and wherein the temperature of the mixture in the thermal hydrolysis reactor is at least 100° C.

14. The method of claim 12 wherein there is provided a depressurizing unit disposed between the thermal hydrolysis reactor and a digester for causing a drop in the pressure of the single phase mixture prior to the single phase mixture being directed into the digester.

15. The method of claim 12 including mixing the sludge and steam in the dynamic mixer-injector sufficient to form a liquid and homogeneous single phase mixture that enables the single phase mixture to flow in a plug flow manner downstream of the dynamic mixer-injector.

16. The method of claim 12 including pumping the sludge continuously through the dynamic mixer-injector and continuously pumping the single phase mixture from the dynamic mixer-injector to and through the thermal hydrolysis reactor which constitutes a tube reactor.

17. The method of claim 12 including simultaneously pumping sludge into the dynamic mixer-injector and injecting steam into the dynamic mixer-injector.

18. The method of claim 12 wherein the blades only mix the sludge and steam and do not cause the sludge and steam to move through the dynamic mixer-injector.

19. The method of claim 12 wherein dewatering the sludge produces a dry solids content of over 20% by weight and the sludge with the dry solids content over 20% by weight is directed into the dynamic mixed-injector where steam is mixed with the sludge.

20. The method of claim 12 including adjusting the speed of the rotating blades according to the dry solids content of the sludge.

21. The method of claim 12 wherein the speed of the rotating blades is modified according to the dry solids content of the sludge.

* * * * *